United States Patent [19]

Oshima et al.

[11] Patent Number: 5,046,170
[45] Date of Patent: Sep. 3, 1991

[54] INFORMATION CARRIER DISK HOUSING HAVING INCORRECT INSERTION PREVENTION

[75] Inventors: Yutaka Oshima, Yokohama; Hiroshi Nishizawa, Hanamaki; Manabu Murata, Yokohama, all of Japan

[73] Assignee: Matsushita Electric Industrial Co., Ltd., Osaka, Japan

[21] Appl. No.: 412,759

[22] Filed: Sep. 26, 1989

[30] Foreign Application Priority Data

Sep. 29, 1988 [JP] Japan .............................. 63-244924

[51] Int. Cl.⁵ ..................... G11B 23/03; G11B 5/016
[52] U.S. Cl. .................... 360/133; 360/99.02
[58] Field of Search .......................................... 360/133

[56] References Cited

U.S. PATENT DOCUMENTS 4,546,397 10/1985 Asami et al. ......................... 360/133
4,646,193 2/1987 Gitzendanner ...................... 360/133
4,688,206 8/1987 Nakagawa et al. .................. 360/133
4,740,949 4/1988 Davis ................................... 360/133

Primary Examiner—John H. Wolff
Assistant Examiner—Jefferson Evans
Attorney, Agent, or Firm—Panitch Schwarze Jacobs & Nadel

[57] ABSTRACT

A magnetic disk cassette that has a slidable shutter with a first notch, the shutter being open by engaging a swingable shutter opener with the first notch while the magnetic disk cassette is being inserted into a cassette holder, wherein single or plural second notches are provided at a portion of the cassette that is symmetrical to the position of the first notch with respect to the rotation center of a magnetic disk that is housed in the cassette, whereby when the cassette is inserted into the cassette holder up side down, the shutter opener engages with the second notch(es) to prevent the cassette from being inserted to the innermost of the cassette holder.

8 Claims, 5 Drawing Sheets

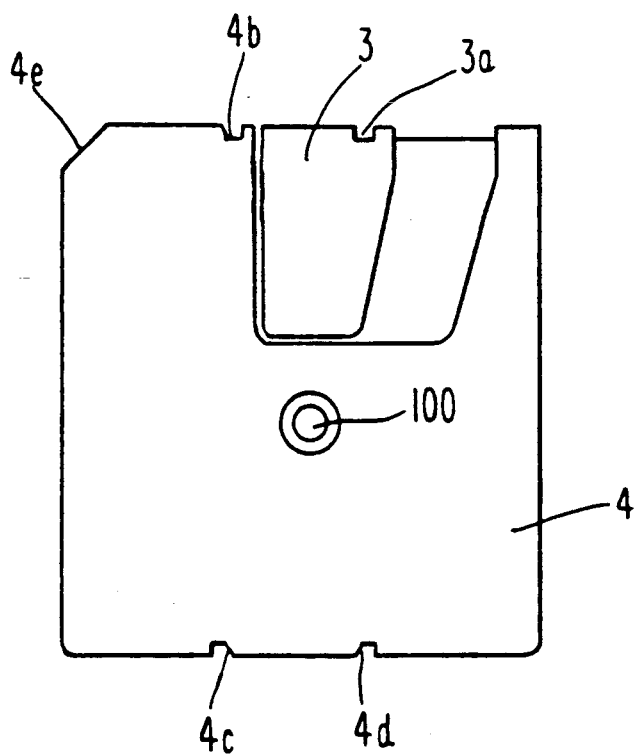
Fig. 3
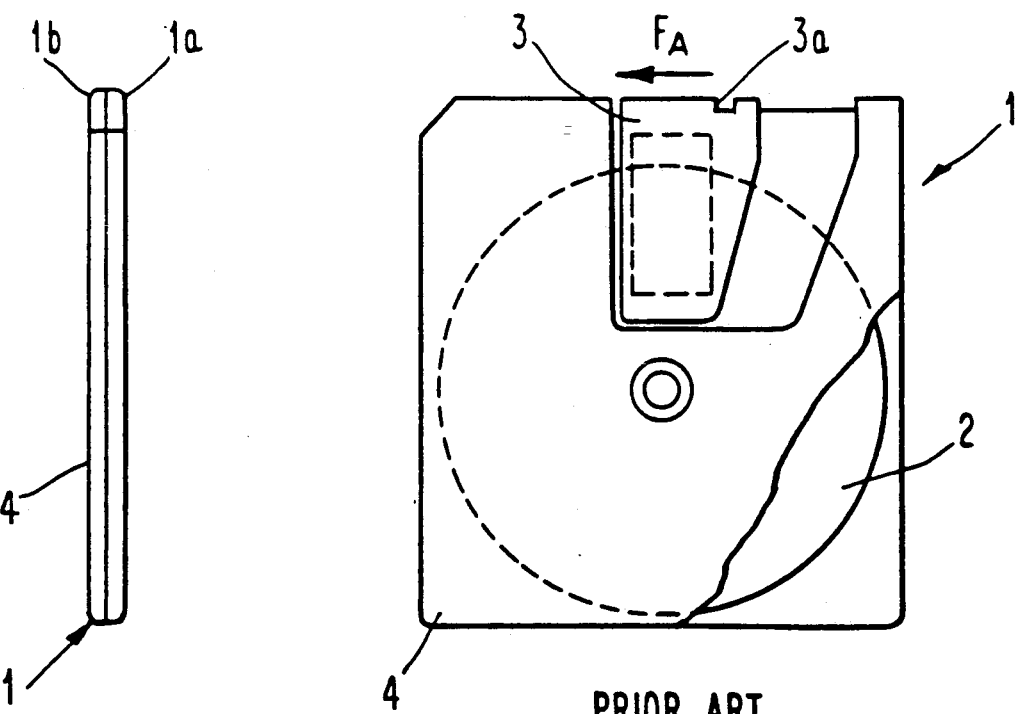
PRIOR ART
Fig. 4b
PRIOR ART
Fig. 4a

INFORMATION CARRIER DISK HOUSING HAVING INCORRECT INSERTION PREVENTION

BACKGROUND OF THE INVENTION

1. Field of the Invention

This invention relates to an information carrier disk housing provided with a shutter which is used in floppy disk apparatuses or the like.

2. Description of the Prior Art

FIGS. 4a and 4b, respectively, are a plan view and a side view of a conventional magnetic disk cassette 4 where a recording medium such as a magnetic disk 2 that allows storage of play back signals is rotatably housed in a cassette housing 1. The cassette housing 1 comprises an upper shell 1a and a lower shell 1b. A shutter 3 of the magnetic disk cassette 4 is usually closed by the force $F_4$ of a spring (not shown) incorporated in the cassette housing 1. The reference numeral 3a is a shutter notch.

FIG. 5a shows the above-mentioned conventional magnetic disk cassette 4 inserted halfway into a cassette holder 5 of a disk drive apparatus. The reference numeral 5b is a spring retainer which is a part of the cassette holder 5 raised up, 6 is a shutter opener arm, 6a is a shutter opener pin, 6b is a spring retainer, 7 is a shutter opener shaft, and 8 is a tension spring. The shutter opener arm 6 is rotatably linked to the cassette holder 5 by the shutter opener shaft 7 and is forced in the direction of arrow A by the tension spring 8 which is stretched between the spring retainers 5b and 6b.

FIG. 5a shows the magnetic disk cassette 4 which is being inserted into the cassette holder 5, in which the shutter notch 3a of the magnetic disk cassette 4 is going to be locked to the shutter opener pin 6a. Insertion force is further applied to the magnetic disk cassette 4 in the direction of arrow B. FIG. 5b is a perspective view of the shutter opener arm 6 and the shutter opener shaft 7.

As shown in FIG. 6, when the magnetic disk cassette 4 is pressed with an insertion force F, a rotation moment is applied to the shutter opener arm 6 by inserting the magnetic disk cassette 4 in the direction of arrow B. The rotation moment exerted by the force F is greater than the rotation moment which causes the shutter opener arm 6 to swing in the direction of arrow C, which is the sum of (1) the rotation moment exerted by the spring (not shown) incorporated in the magnetic disk cassette 4 through the force $F_4$ applied to the shutter 3 and (2) the rotation moment of the shutter opener arm 6 exerted by the force of the tension spring 8 in the direction of arrow A. As a result of inserting the cassette 4, the shutter opener arm 6 swings in the direction of arrow D around a center point P of the shutter opener shaft 7 and, at the same time, the shutter 3 of the magnetic disk cassette 4 is opened.

FIG. 7 shows the above-mentioned conventional magnetic disk cassette 4 inserted into the cassette holder 5 until the shutter 3 is fully open. At this point, the cassette holder descends to carry out chucking with a spindle shaft (not shown) and head loading.

FIG. 8 shows the above-mentioned conventional magnetic disk cassette 4 inserted into the cassette holder 5 up side down. When inserted up side down, an edge 4a of the magnetic disk cassette 4 and the shutter opener pin 6a are brought into contact with each other, first. When inserted further, the shutter opener pin 6a swings around the point P while sliding along the edge 4a of the disk cassette 4 in contact therewith, and the magnetic disk cassette 4 is further inserted along with the swing motion.

When the magnetic disk cassette 4 is inserted up side down as mentioned above, because a corner 4f of the magnetic disk cassette 4 contacts the stopper 5a of the cassette holder 5, the amount of insertion is slightly less than that in the case where the chamfered part 4e of the magnetic disk cassette 4 contacts the cassette holder stopper 5a in a normal insertion manner. Therefore, an ordinary disk drive apparatus is made in such a structure that the cassette holder lowering mechanism does not work. Consequently, the eject mechanism is not capable of ejecting the magnetic disk cassette.

However, with the above-mentioned conventional magnetic disk cassette, there has been a problem that the magnetic disk cassette is inserted to the innermost of the drive apparatus even when it is inserted up side down, and only a small portion protrudes from the panel face of the drive apparatus or the system, which makes it difficult to hold it with fingers and draw it out.

SUMMARY OF THE INVENTION

The information carrier disk housing of this invention, which overcomes the above-discussed and numerous other disadvantages and deficiencies of the prior art, comprises a cassette which rotatably houses a recording medium which allows storage of play back signals, a shutter which is slidably mounted on one end of the cassette and opens and closes to allow a recording or playback head to contact the recording medium, a first retainer which is mounted on a part of the shutter and contacts a pin of a swingable arm of a cassette holder to cause the shutter to open while sliding as the cassette is inserted into said cassette holder, and a single or plural second retainers which are formed on the cassette and prevents reverse insertion of said information carrier disk.

In a preferred embodiment, the second retainer is formed on one end of the cassette where said first retainer is formed in such a manner that the position of said second retainer is symmetrical to that of said first retainer with respect to the rotation center of said recording medium.

In a preferred embodiment, the second retainers are formed on one end of the cassette opposing the end of the cassette where said first retainer is formed in such a manner that the positions of second retainer are symmetrical to that of said first retainer with respect to the rotation center of said recording medium.

In a preferred embodiment, the positions of said second retainers which are formed on said one end of the cassette are symmetrical to the position of said first retainer about a point and a line with respect to the rotation center of said recording medium, respectively.

In a preferred embodiment, the recording medium is a magnetic disk.

In a preferred embodiment, the shutter is mounted on both sides including an edge of said cassette.

Alternatively, the information carrier disk housing of this invention comprises a cassette means which rotatably houses an information carrier disk which allows storage of play back signals, a shutter means which is slidably mounted on one end of said cassette means and opens and closes to allow a recording or play-back means to contact the information carrier disk, a first retainer which is mounted on a part of said shutter means and contacts a retainer member, which is provided on a swingable arm member of a cassette holder, to cause said shutter means to open while sliding as said cassette is inserted into said cassette holder, and a single or plural second retainers which are formed on the cassette means in such a manner that the position of each of said second retainers is symmetrical to that of said first retainer of said shutter means with respect to the rotation center of said information carrier disk.

In a preferred embodiment, the position of each of said second retainers is symmetrical to that of said first retainer about a point or a line with respect to the rotation center of said information carrier disk.

Thus, the invention described herein makes possible the objective of providing an information carrier disk housing that can be taken out of a disk drive apparatus when it is inserted up side down as well as giving an immediate indication of mis-insertion.

BRIEF DESCRIPTION OF THE DRAWINGS

This invention may be better understood and its numerous objects and advantages will become apparent to those skilled in the art by reference to the accompanying drawings as follows:

FIG. 3 is a plan view showing another housing for housing a magnetic disk of this invention.

FIGS. 4a and 4b, respectively, are a plan view and a side view showing a conventional magnetic disk cassette.

FIG. 5b is a perspective view showing a shutter opener arm to be mounted on the cassette holder of FIG. 5a.

DESCRIPTION OF THE PREFERRED EMBODIMENTS

This invention provides an information carrier disk housing, wherein notches are provided on an edge or edges of the housing which are parallel to the direction of the shutter movement.

According to this invention, when the housing that houses a magnetic disk therein is inserted into a disk drive apparatus in a wrong manner, the shutter opener pin is locked in notches of the housing, to become unable to swing, so that the housing cannot be inserted to the innermost position.

EXAMPLE 1

Figure 1:
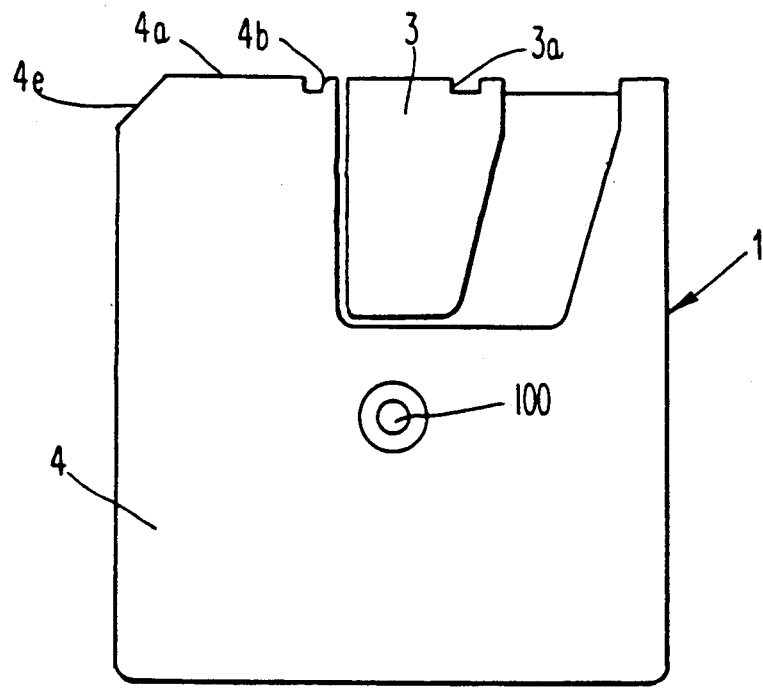
FIG. 1 is a plan view showing a housing for housing a magnetic disk therein of this invention.

FIG. 1 shows the information carrier disk housing 1 of the present invention. The housing 1 comprises a magnetic disk cassette 4 in which a recording medium such as a magnetic disk that allows storage of play back signals is rotatably housed.

Figure 2:
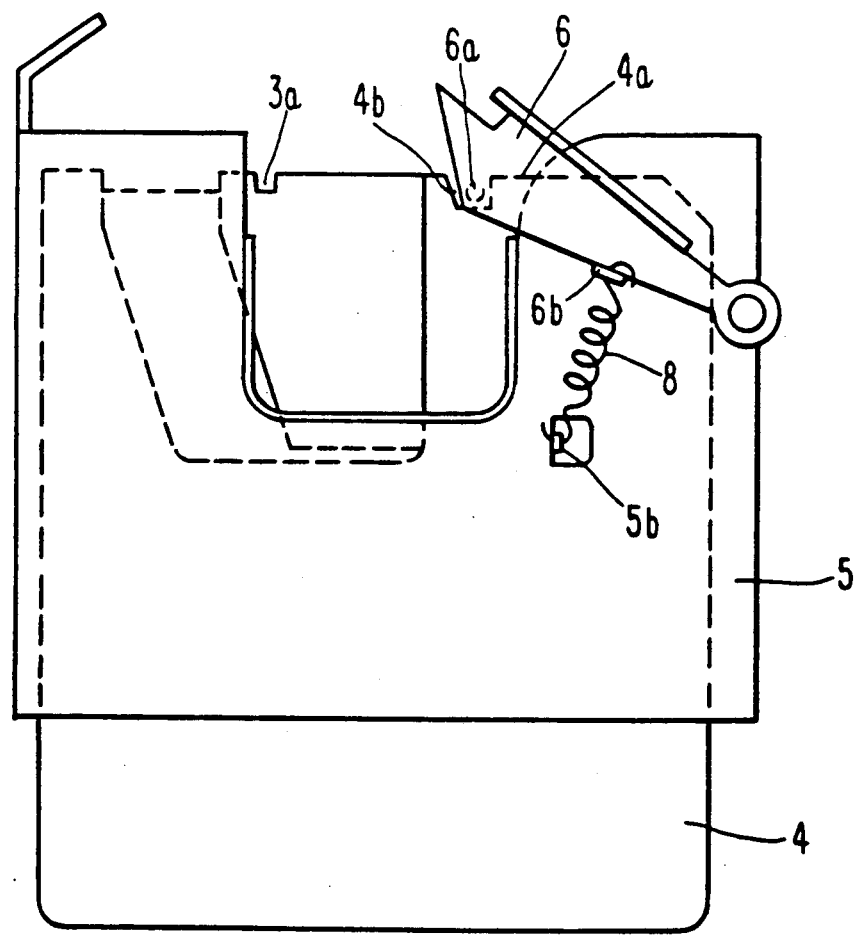
FIG. 2 is a plan view showing the magnetic disk cassette of FIG. 1 that has been mis-inserted into a cassette holder of a disk drive apparatus.
Figure 5A:
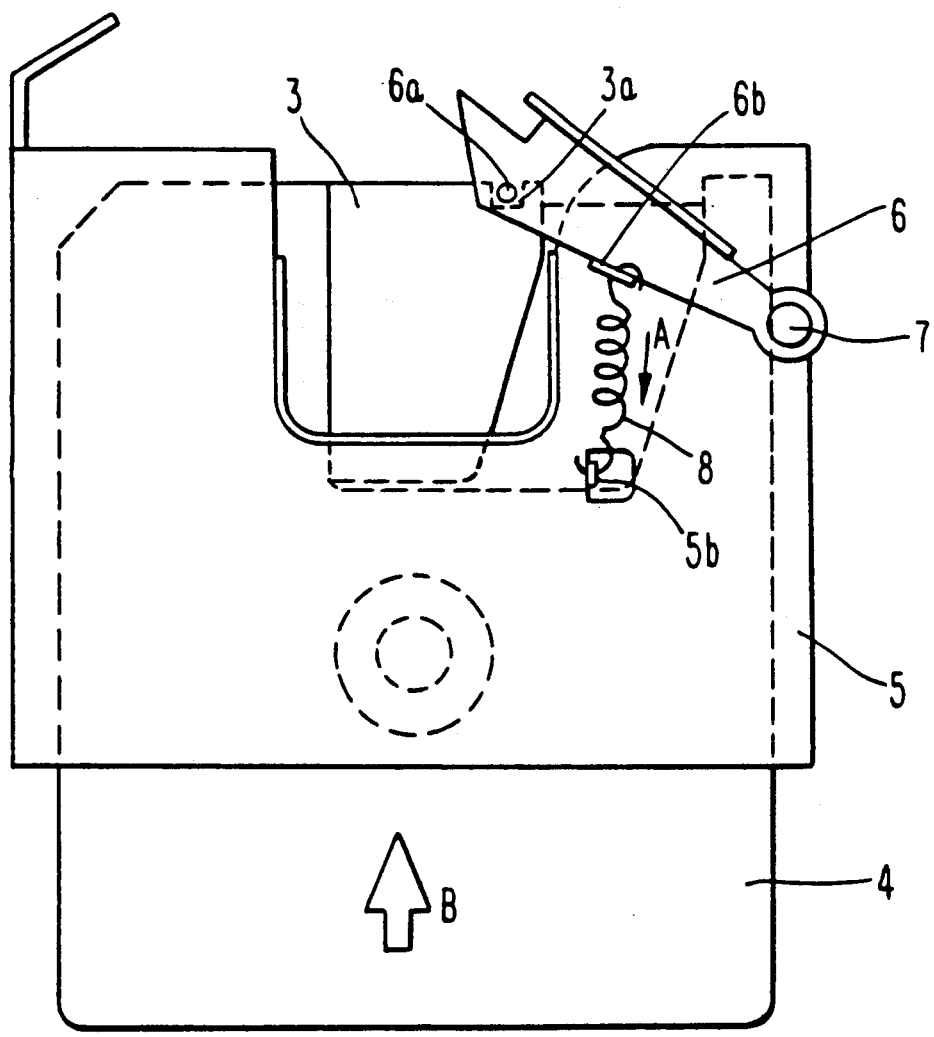
FIG. 5a is a plan view showing the magnetic disk cassette of FIG. 4 that is being inserted into a cassette holder.
Figure 5B:
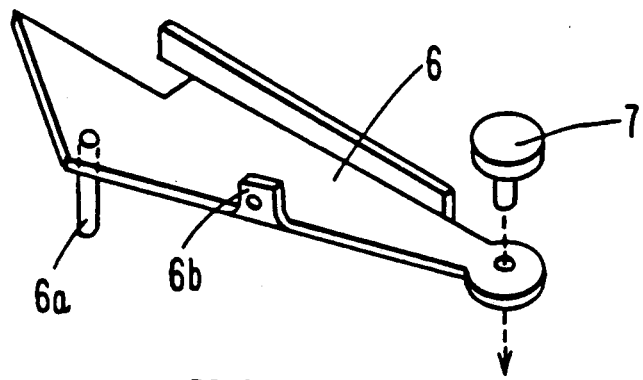
Figure 6:
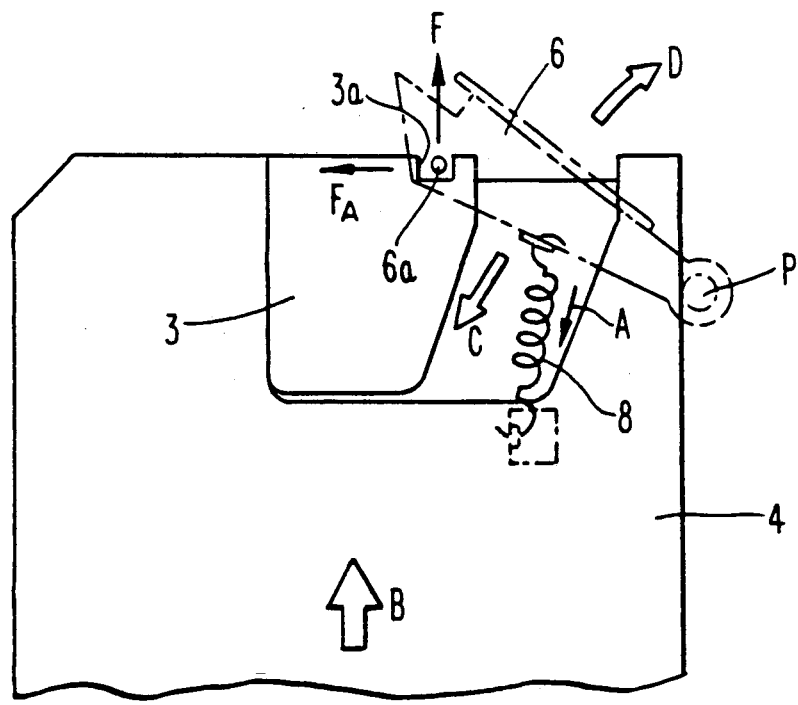
FIG. 6 is a schematic diagram showing the operation relationship between the shutter and the shutter opener arm.
Figure 7:
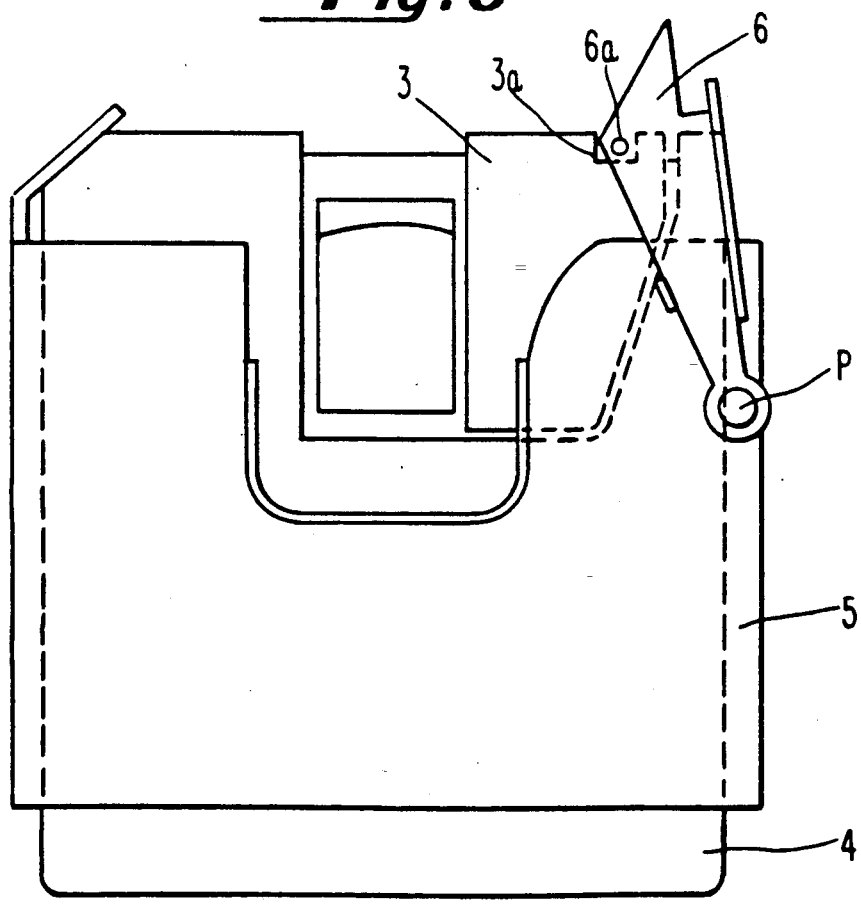
FIG. 7 is a plan view showing the magnetic disk cassette of FIG. 4 that has been inserted into the cassette holder until the shutter is fully open.
Figure 8:
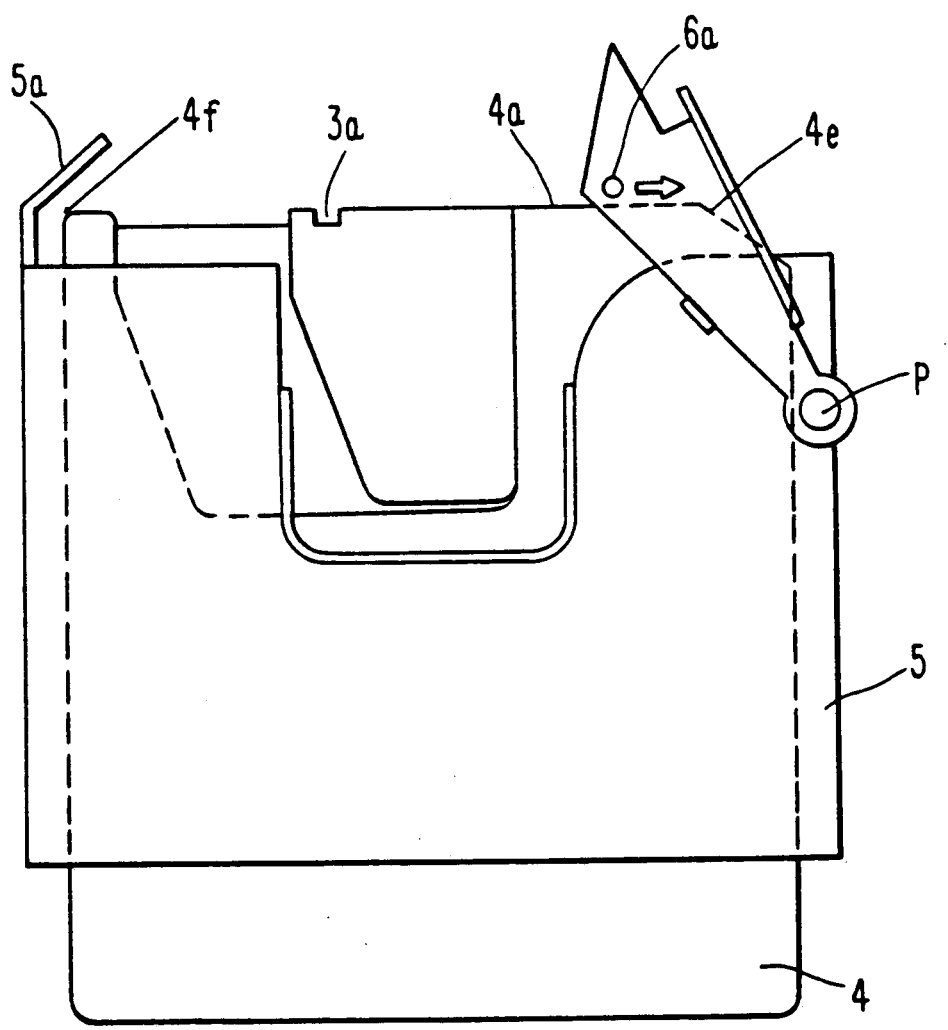
FIG. 8 is a plan view showing the magnetic disk cassette of FIG. 4 that has been inserted into the cassette holder up side down.

The magnetic disk cassette 4 is provided with a shutter 3 that is usually closed in the same manner as described in the item "Description of the prior art". The shutter 3 has a first retainer, i.e., a shutter notch 3a, which functions in the same manner as mentioned above. A second retainer, i.e., a notch 4b for preventing the magnetic disk cassette 4 from being inserted into a cassette holder 5 (FIG. 2) in the reversed direction, is formed on one end of the cassette 4 where the first retainer 3a is formed in such a manner that the position of the second retainer 4b is symmetrical to that of the first retainer 3a with respect to the rotation center 100 of the information carrier disk. That is, the second retainer 4b is provided near the position where the shutter opener pin 6a (FIG. 2) is, first, brought into contact with the one end of the cassette 4 when the cassette 4 is inserted up side down. FIG. 2 shows the magnetic disk cassette 4 of FIG. 1 that has been mis-inserted into the cassette holder 5 of a disk drive apparatus. When the magnetic disk cassette 4 is mis-inserted, the shutter opener pin 6a is locked in the second retainer (i.e., the reverse insertion prevention notch) 4b of the magnetic disk cassette 4 and the shutter opener pin 6a does not slide along the edge 4a of the magnetic disk cassette 4 even though further insertion is tried, thereby preventing the magnetic disk cassette 4 from being further inserted into the cassette holder 5.

EXAMPLE 2

FIG. 3 shows another information carrier disk housing of this invention, wherein additional second retainers such as notches 4c and 4d are provided on one end of the cassette 4 opposing the end of the cassette 4 where the first retainer 3a is formed in such a manner that the positions of the second retainers 4c and 4d are symmetrical to that of the first retainer 3a about a point and a line with respect to the rotation center 100 of the information carrier disk, respectively. Therefore, even when the magnetic disk cassette 4 is inserted up side down or in a reversed direction, it is stopped and is prevented from being inserted further, in the same way as the case of the above-mentioned example.

Although the shutter 3 is opened and closed by means of the pin 6a provided on the shutter opener arm 6 and the notch 3a provided on the shutter 3 in the above-mentioned examples, the shutter 3 can also be opened and closed by means of a hook member instead of the pin 6a and a hole or the like instead of the notch 3a.

Moreover, the mis-insertion of the disk cassette 4 in the direction that is perpendicular to the normal insertion direction can also be prevented by means of a mis-insertion prevention notch that is provided on a side edge of the magnetic disk cassette 4.

Although the invention has been described for an application to magnetic disks in the above-mentioned examples, the invention is, of course, applicable to optical disks or the like, and also applicable to various applied devices such as optical filing systems and magnetic cameras other than floppy disk apparatuses.

As mentioned above, the information carrier disk housing of this invention is provided with a reverse insertion prevention notch, and accordingly the shutter opener pin does not swing and stops in the course of insertion when the housing is mis-inserted, so that the mis-insertion can be immediately noticed. In addition, because the housing is not inserted to the innermost, a portion of the housing which protrudes from the disk drive apparatus is large enough to hold it with fingers to take it out.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An information carrier disk housing comprising: a cassette having a first end and a second end, said cassette rotatably housing a recording medium which allows storage of playback signals, a shutter which is slidably mounted on said first end of the cassette, the shutter opening and closing to allow a recording or playback head to contact the recording medium, said shutter including a first retainer means for contacting a pin of a swingable arm of a cassette holder to cause the shutter to slide open as the cassette is inserted into said cassette holder, and second retainer means formed on the cassette for preventing the completion of an incorrect insertion of said information carrier disk in said holder by contacting said pin.

2. An information carrier disk housing according to claim 1, wherein said second retainer means is formed on the first end of the cassette where said first retainer means is formed in such a manner that the position of said second retainer means is symmetrical to that of said first retainer means with respect to the rotation center of said recording medium.

3. An information carrier disk housing according to claim 1, wherein said second retainer means is formed on the second end of the cassette in such a manner that the position of the second retainer means is symmetrical to that of said first retainer means with respect to the rotation center of said recording medium.

4. An information carrier disk housing according to claim 3, further including third means positioned on said second end of said cassette for preventing the completion of an incorrect insertion of said information carrier disk in said holder, wherein the positions of said second and third means are symmetrical to the position of said first retainer means with respect to the rotation center of said recording medium.

5. An information carrier disk housing according to claim 1, wherein said recording medium is a magnetic disk.

6. An information carrier disk housing according to claim 1, wherein said cassette includes an upper shell and a lower shell, said shutter being mounted on said cassette such that said shutter is in sliding engagement with said upper and lower shells.

7. An information carrier disk housing comprising: cassette means having a first end and a second end, said cassette means rotatably housing an information carrier disk which allows storage of playback signals, shutter means which is slidably mounted on said first end of said cassette means, the shutter opening and closing to allow a recording or playback means to contact the information carrier disk, said shutter including first retainer means for contacting a retainer member, which is provided on a swingable arm member of a cassette holder, to cause said shutter means to slide open as said cassette means is inserted into said cassette holder, and second retainer means formed on the cassette means for preventing the completion of an incorrect insertion of said information carrier disk in said holder, such second retainer means being formed on the cassette means in such a manner that the position of each of said second retainer means is symmetrical to that of said first means of said shutter means with respect to the rotation center of said information carrier disk.

8. An information carrier disk housing according to claim 7, further including third means positioned on said second end of said cassette means for preventing the completion of an incorrect insertion of said information carrier disk in said holder, wherein the position of each of said second and third means is symmetrical to that of said first retainer means with respect to the rotation center of said information carrier disk.

* * * * *